(12) United States Patent
Smallhorn (10) Patent No.: US 8,684,320 B2
(45) Date of Patent: Apr. 1, 2014

(54) SUPPORT BRACKET FOR MOUNTING WIRES TO FLOOR BEAMS OF AN AIRCRAFT

(75) Inventor: George R. Smallhorn, St-Laurent (CA)

(73) Assignee: Inflight Investments Inc., St-Laurent (CA)

( * ) Notice: Subject to any disclaimer, the term of this patent is extended or adjusted under 35 U.S.C. 154(b) by 134 days.

(21) Appl. No.: 13/207,565

(22) Filed: Aug. 11, 2011

(65) Prior Publication Data

US 2011/0290954 A1 Dec. 1, 2011

Related U.S. Application Data

(63) Continuation-in-part of application No. 11/898,835, filed on Sep. 17, 2007, now abandoned.

(51) Int. Cl.
*F16L 3/08* (2006.01)
*F16L 3/12* (2006.01)

(52) U.S. Cl.
USPC .............. 248/74.1; 248/71; 248/72; 248/73

(58) Field of Classification Search
USPC ......... 248/74.1, 73, 72, 231.31, 71; 174/40 R
See application file for complete search history.

(56) References Cited

U.S. PATENT DOCUMENTS

| | | | |
|---|---|---|---|
| 3,146,982 A | 9/1964 | Budnik | |
| 3,572,623 A | 3/1971 | Lapp | |
| 3,923,277 A * | 12/1975 | Perrault et al. | 248/49 |
| 4,019,705 A | 4/1977 | Habuda, Sr. et al. | |
| 4,353,519 A | 10/1982 | Bogart | |
| 4,759,654 A | 7/1988 | Martin et al. | |
| 4,896,851 A | 1/1990 | Shaull | |
| 4,899,963 A | 2/1990 | Murphy | |
| 5,104,079 A | 4/1992 | Hardtke | |
| 5,352,078 A | 10/1994 | Nasu | |
| 5,797,573 A * | 8/1998 | Nasu | 248/231.31 |
| 5,876,000 A | 3/1999 | Ismert | |
| 5,992,802 A | 11/1999 | Campbell | |
| 6,098,942 A | 8/2000 | Heath | |
| 6,126,122 A | 10/2000 | Ismert | |
| 6,402,096 B1 | 6/2002 | Ismert et al. | |
| 6,446,915 B1 | 9/2002 | Ismert | |
| 6,520,705 B2 | 2/2003 | Stasney, Jr. | |
| 6,533,226 B2 * | 3/2003 | Geiger | 248/74.3 |
| 6,652,313 B2 | 11/2003 | Lambiaso | |

(Continued)

OTHER PUBLICATIONS

Wiring Accessories, Amphenol Air AB catalogue edition 01/01 dated 2006.

(Continued)

*Primary Examiner* — Amy J Sterling
(74) *Attorney, Agent, or Firm* — Norton Rose Fulbright LLP; Paul J. Field (57) ABSTRACT

A support bracket for mounting wires, cables, conduits and the like to floor beams of an aircraft passenger cabin floor without modification to the floor beams, the floor beams having a top flange, a bottom flange, and a vertical web. The support bracket has a support body with cable support cradles where each cradle has a cradling surface and a tie wrap passage; and at least clamping block connected to the support body with at least one adjustable tension bolt, the clamping block having a beam engaging surface wherein tension in the at least one bolt urges the beam engaging surface toward the support body.

7 Claims, 9 Drawing Sheets

(56) References Cited

U.S. PATENT DOCUMENTS

| | | | |
|---|---|---|---|
| 7,055,783 B2 * | 6/2006 | Rosemann et al. | 248/71 |
| 7,377,472 B2 | 5/2008 | Brown et al. | |
| 7,419,124 B2 | 9/2008 | Zeuner et al. | |
| 7,784,743 B2 * | 8/2010 | Zeuner et al. | 248/63 |
| 8,313,064 B2 * | 11/2012 | Stocker | 248/71 |
| 2005/0201419 A1 * | 9/2005 | Adler | 370/503 |

OTHER PUBLICATIONS

European Search Report dated May 22, 2013 on corresponding EP 08164451.0.

Extended European Search dated Sep. 6, 2013 on corresponding patent application EP 08 16 4451.

* cited by examiner

SUPPORT BRACKET FOR MOUNTING WIRES TO FLOOR BEAMS OF AN AIRCRAFT

RELATED APPLICATION

This application is a continuation-in-part of application Ser. No. 11/898,835 filed Sep. 17, 2007.

TECHNICAL FIELD

The invention relates to a removable support bracket for mounting wires, cables, conduits and the like to the floor beams of an aircraft passenger cabin floor beam without modifying or altering the floor beam.

BACKGROUND OF THE ART

In the passenger cabins of aircraft an increasingly important component is the provision of passenger entertainment systems, mobile telephone services, laptop power and computer communications connectivity. To improve service, airlines are retrofitting existing aircraft and ordering newly built aircraft with audio and video entertainment on demand, telephone, intercom, television, video games, internet, email and electrical power supply for laptop computers, especially in business class and first class areas to permit passengers to work during the flight, communicate or seek entertainment.

One way of installing equipment and wiring for such systems is to disengage floor panels from the beams supporting the passenger cabin floor. The wiring is run between passenger seats and various computer servers or other electronic equipment under the floor panels. After installation the floor panels are reattached to the floor beams.

A particular concern with installing equipment in an aircraft is that any modification to the aircraft structure could weaken the structure or introduce stress concentrations that lead to metal fatigue and crack propagation. Therefore when installing new equipment in an existing aircraft, drilling holes in floor beams to mount wiring and equipment requires approval from government regulatory inspectors, requires a high degree of accuracy and is generally not preferred for these reasons which add cost and delay.

In a newly built aircraft the manufacturer can provide for mounting brackets and holes in floor beams as part of the original design of the aircraft structure. However such designs do not provide for flexibility in relocating wiring or equipment, during manufacturing or afterwards during the service life of the aircraft.

Accordingly it is desirable to have mounting brackets for wires, cables, conduits and the like that can be attached and removed from aircraft floor beams without modifying the floor beams in any way.

It is further desirable that such mounting brackets be low cost, be of standard or universal design and be as lightweight as possible for an aircraft application.

Features that distinguish the present invention from the background art will be apparent from review of the disclosure, drawings and description of the invention presented below.

DISCLOSURE OF THE INVENTION

The invention provides a support bracket for mounting wires, cables, conduits and the like to floor beams of an aircraft passenger cabin floor without modification to the floor beams, the floor beams having a top flange, a bottom flange, and a vertical web. The support bracket has a support body with cable support cradles where each cradle has a cradling surface and a tie wrap passage; and at least clamping block connected to the support body with at least one adjustable tension bolt, the clamping block having a beam engaging surface wherein tension in the at least one bolt urges the beam engaging surface toward the support body.

DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION OF PREFERRED EMBODIMENTS

Figure 1:
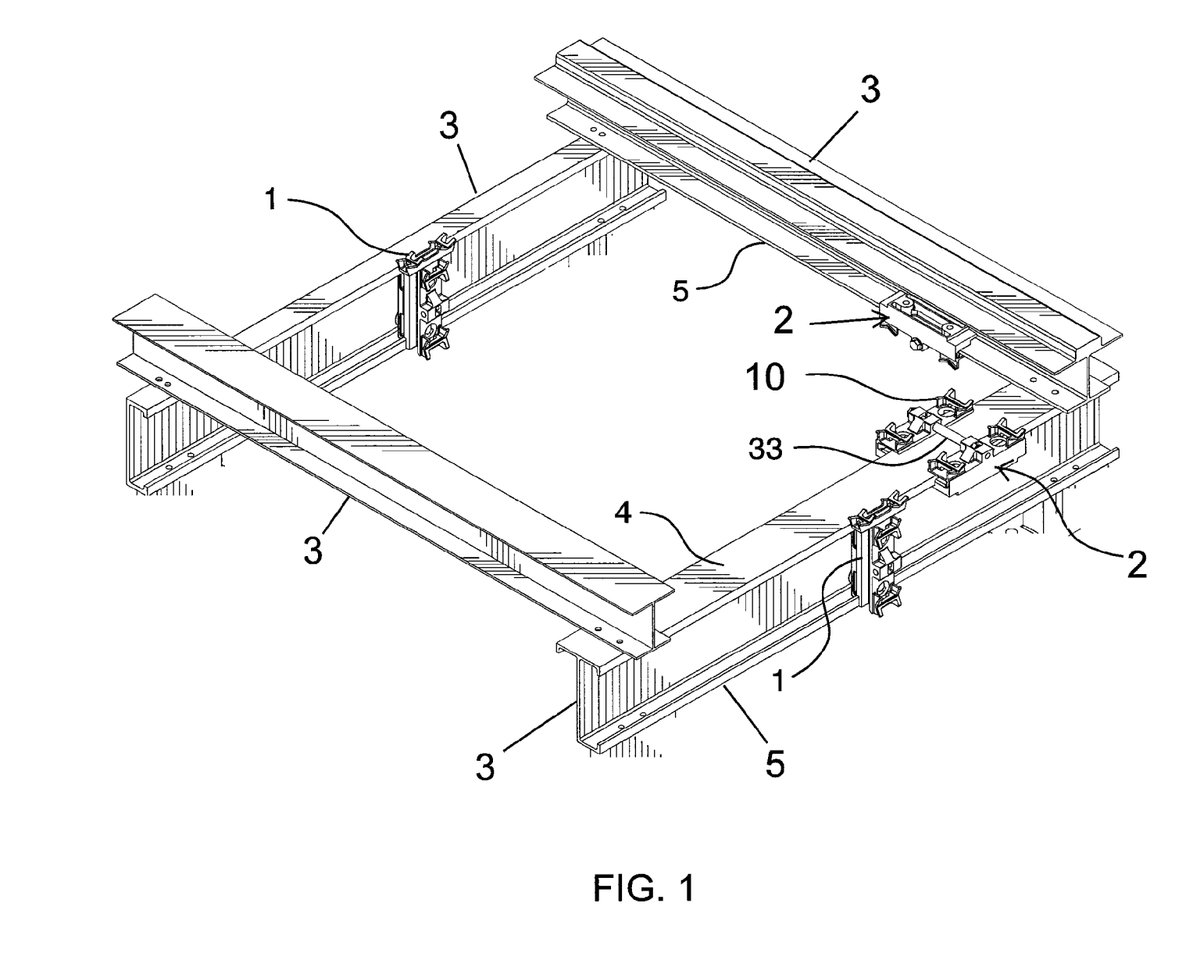
FIG. 1 an isometric view of several brackets mounted to floor beams including: two bodies mounted horizontally one on each side of the top flange, two bodies mounted horizontally one on each side of the bottom flange, and two separate brackets aligned vertically each mounted to the top and bottom flanges.

FIG. 1 shows an isometric view of several brackets mounted to sections of floor beams 3.

Figure 2:
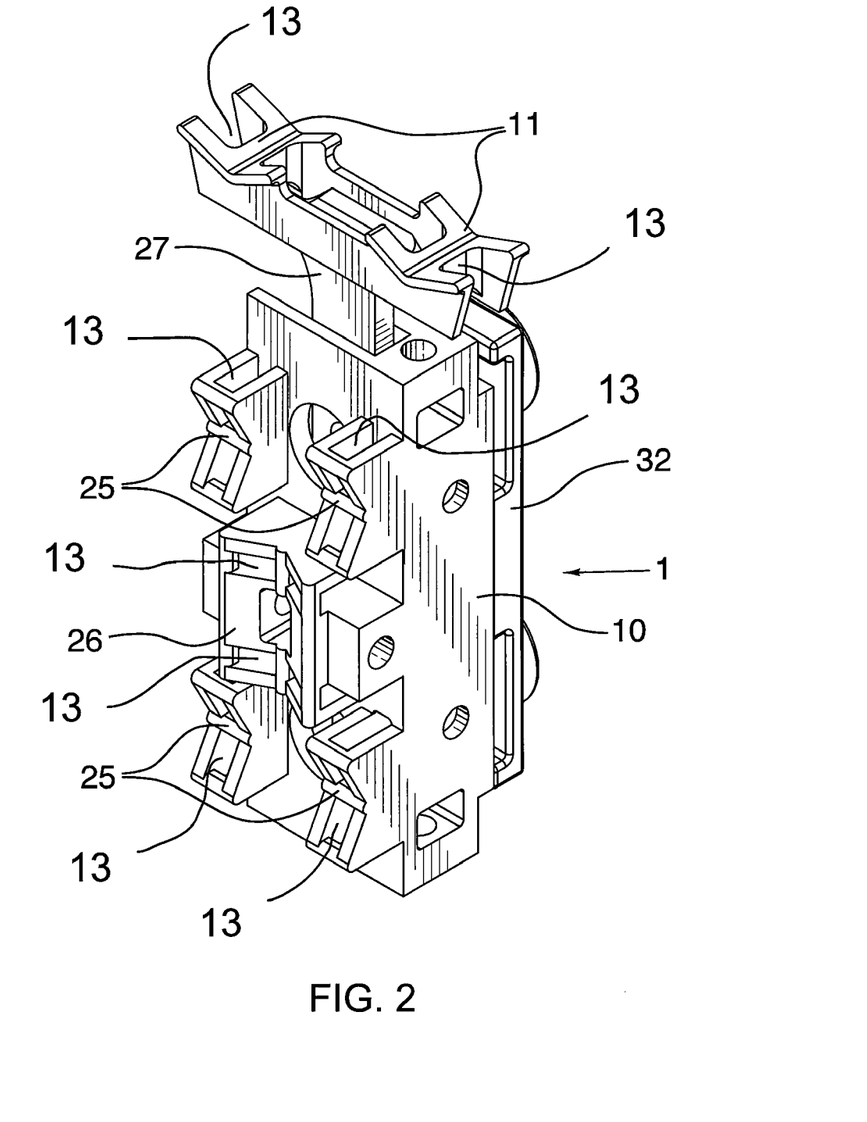
FIG. 2 shows a first embodiment in an isometric view with a single rear mounted clamping block.
Figure 3:
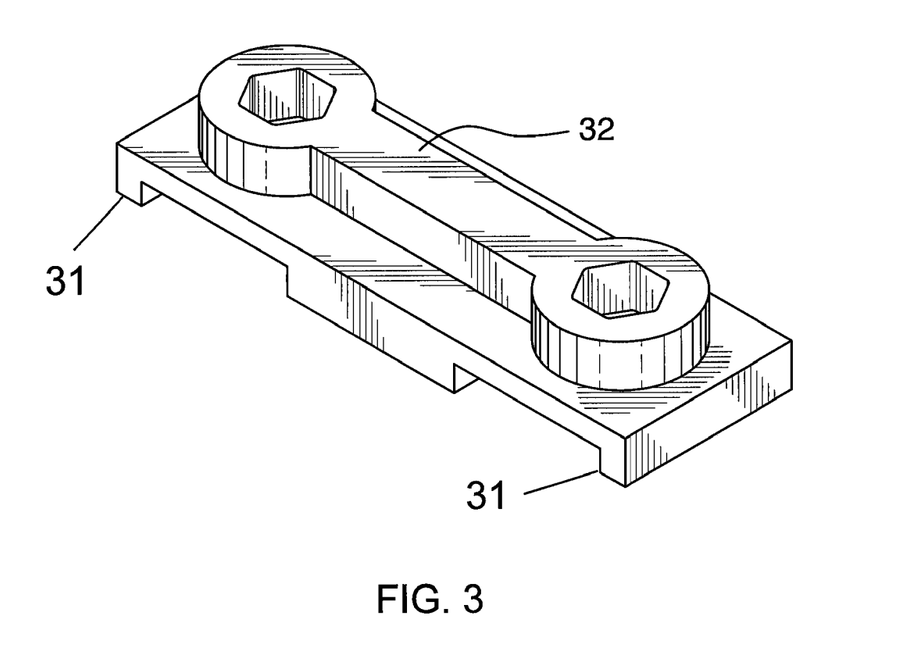
FIG. 3 shows an isometric view of the single rear mounted clamping block of FIG. 2.

A first embodiment of the bracket 1 is also shown in FIGS. 2 and 3 having a vertically aligned support body 10 mounted to the top flange 4 and bottom flange 5 of the floor beam 3 with a single clamping block 32 (see FIG. 3).

Figure 4:
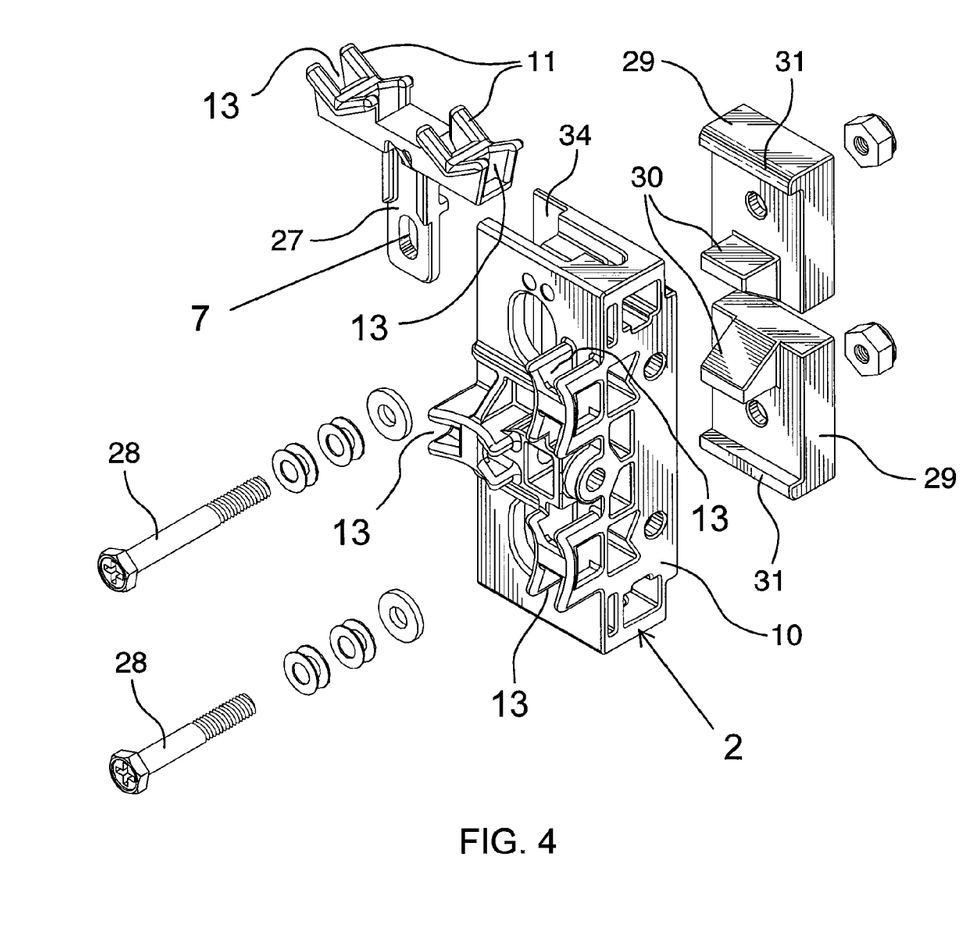
FIG. 4 shows a second embodiment in an exploded isometric view with two rear mounted clamping blocks secured with two bolts, washers and nuts.
Figure 5:
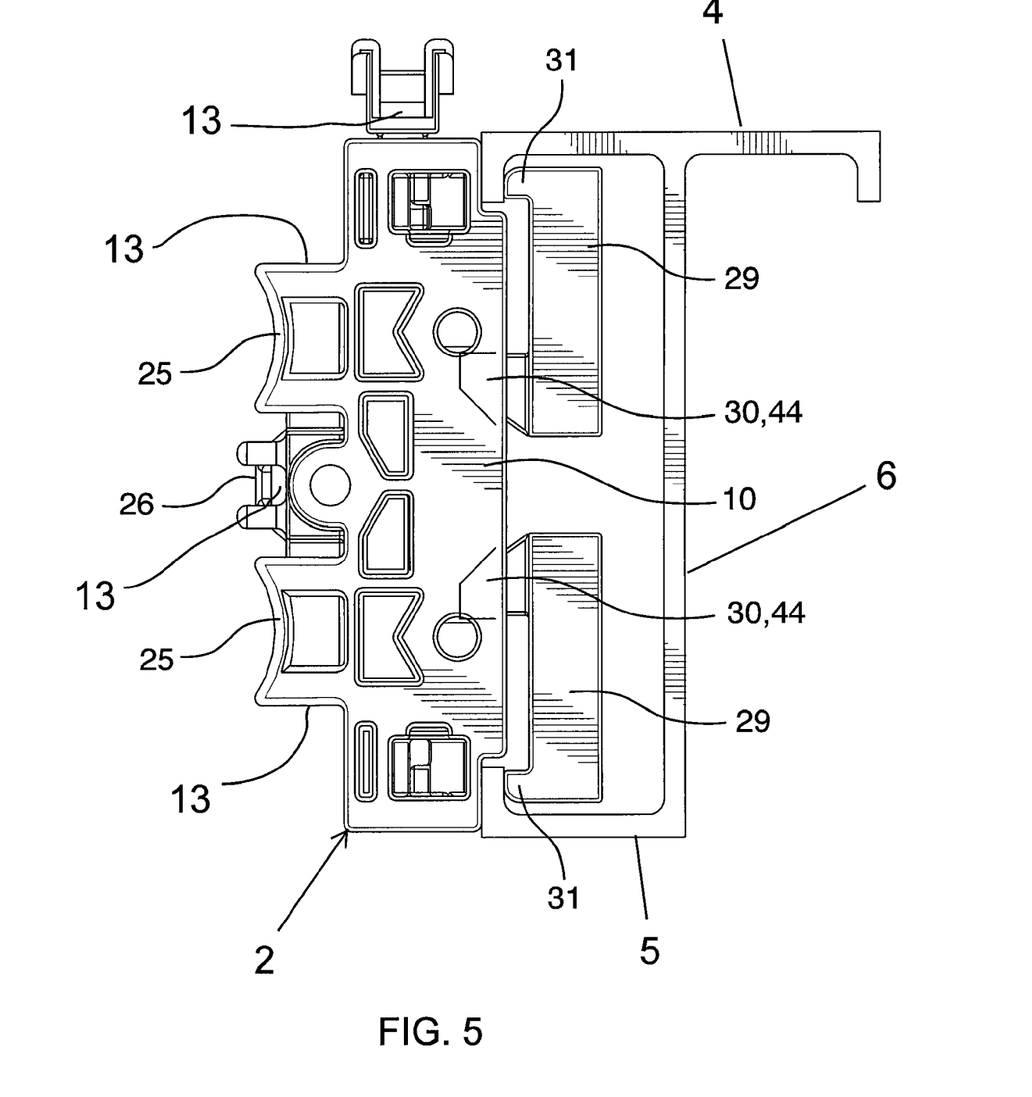
FIG. 5 shows the bracket of FIG. 4 installed on a floor beam parallel to the web and clamping the edges of the top and bottom flanges of the beam with the two clamping blocks.

FIGS. 4-5 show a second embodiment of the bracket 1 as also shown in FIG. 2 having a vertically aligned support body 10 mounted to the top flange 4 and bottom flange 5 of the floor beam 3 with two clamping blocks 29.

FIGS. 6-9 show details of a third embodiment of a support bracket 2 where the bracket 2 is made from two identical bodies 10 joined together with a lateral threaded rod 33 to engage the flange of the beam within a lateral slot 34 in the bodies 10.

Therefore it will be understood that the same support body 10 can be used in each of the first, second and third embodiments. The body 10 can be molded from plastic in a single mold, can be reused and relocated for these different arrangements.

As shown in FIG. 2, the first embodiment, the support bracket 1 has rectangular block shaped support body 10 shaped generally as a rectangular block with a number of cradles 25, 26 on a front surface. A removable T-shaped post 27 with cradles 11 which engages a slot 34 in the body 10 and is secured with a bolt connector 28 (best seen in FIG. 4 but relating to the second embodiment).

The support bracket 1 enables mounting of wires, cables, conduits and the like to the floor beams 3 of an aircraft passenger cabin floor without modification to the floor beams 3. Best shown in FIG. 5, the floor beams 3 have a top flange 4, a bottom flange 5, and a vertical web 6 extending between the flanges 4, 5.

As shown in FIG. 2, the support body 10 has a plurality of cradles 25, 26, 11 wherein each cradle 25, 26, 11 has a cradling surface (shown V-shaped) and a tie wrap passage 13 through the cradle 25, 26, 11 through which a cable tie can be passed to secure cylindrical cables to the cradle 25, 26, 11.

Shown in FIGS. 2-5, each bracket 1 includes at least clamping block 32, 29 connected to the support body 10 with at least one adjustable tension bolt 28 (see FIG. 4). The clamping block 32, 29 each has a beam engaging ridge 31 so that tension in the bolts 28 urge the beam engaging ridge toward the support body 10 to grip the beam flanges 4, 5. In other words, tightening the nuts on the bolts 28 will draw the clamping blocks 29, 32 toward the body 10 and in the process will grip the flanges 4, 5 with the ridge 31.

The support bracket 1 according to the first embodiment of FIGS. 2-3 uses a single clamping block 32. The support bracket 1 according to the second embodiment of FIGS. 4-5 uses an upper clamping block 29 connected to the support body 10 with an upper adjustable tension bolt 28 and having an upper beam engaging ridge 31 and a lower clamping block 29 connected to the support body 10 with a lower adjustable tension bolt 28 and having a lower beam engaging ridge 31.

Each upper and lower clamping block 29 preferably includes a fulcrum projection 30 and the body 10 includes a fulcrum recess 44 mating the fulcrum projection 30, to guide the movement of the clamping blocks 29.

Seen best in FIG. 4 the body 10 also preferably includes a removable post 27 having a plurality of cradles 11 wherein each cradle 11 has a V-shaped cable engaging surface and a wrap tie passage 13. The post 27 is shown with a slotted mounting hole 7 that is secured with the bolt 28 in the slot 34 of the body 10. Of course sine the body 10 and post 27 are symmetrical the post 27 can be mounted in a downward position on the lower bolt 28 as well.

The third embodiment is shown in FIGS. 6-9 where the support bracket 2 is made from a first support body 10 and where the clamping block is a second support body 10 of identical shape. The first and second support bodies 10 each have a lateral slot 34 defining an internal beam clamping surface and a laterally extending threaded rod 33 passes through the first and second support bodies 10 to clamp them around the top flange 4 as shown, or the bottom flange 5 (not shown).

Figure 6:
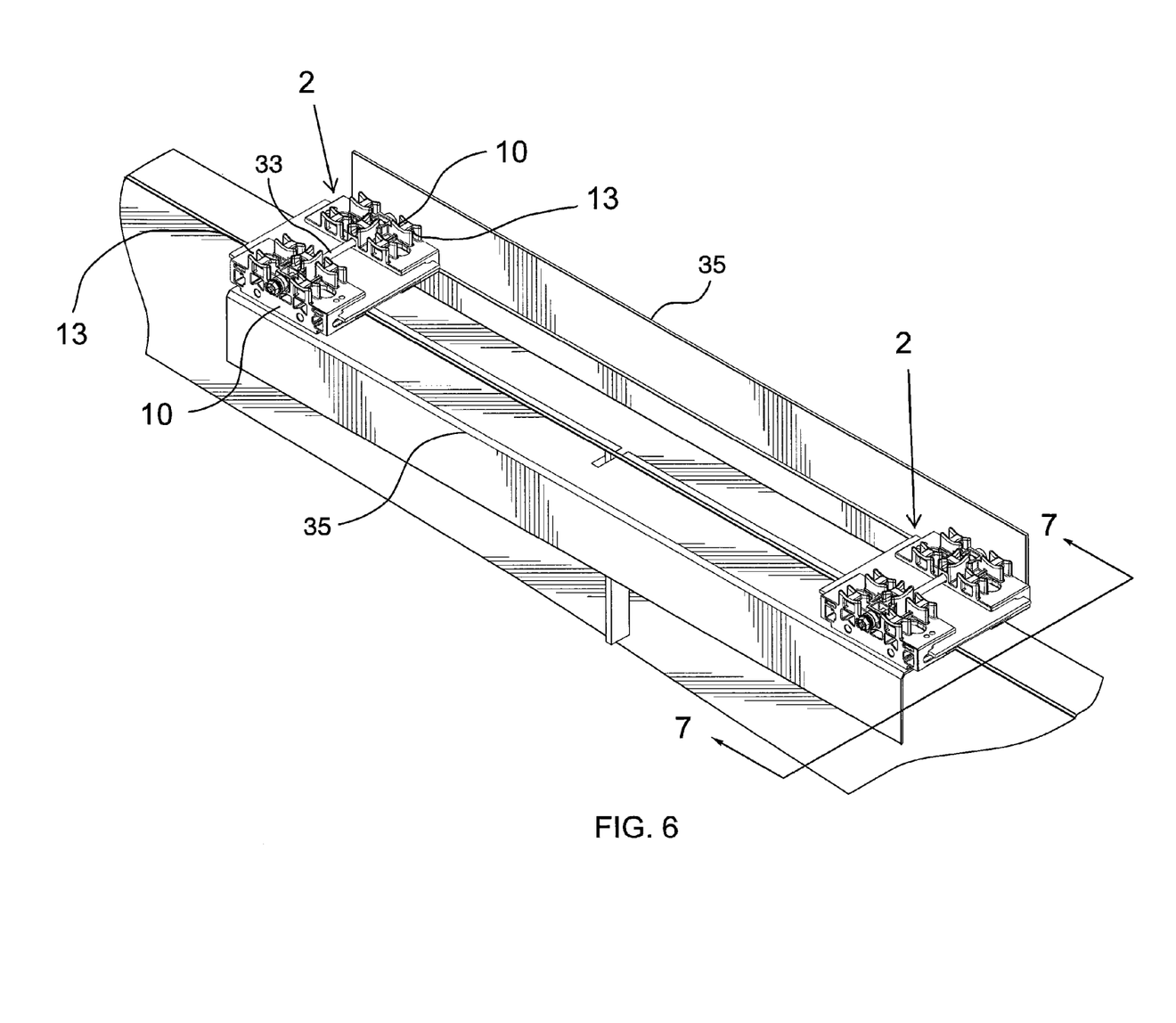
FIG. 6 shows an isometric view of a third embodiment with four support bodies, mounted in opposing pairs to engage the top flange of a floor beam, and mounting two longitudinal angles to the beam flange.
Figure 7:
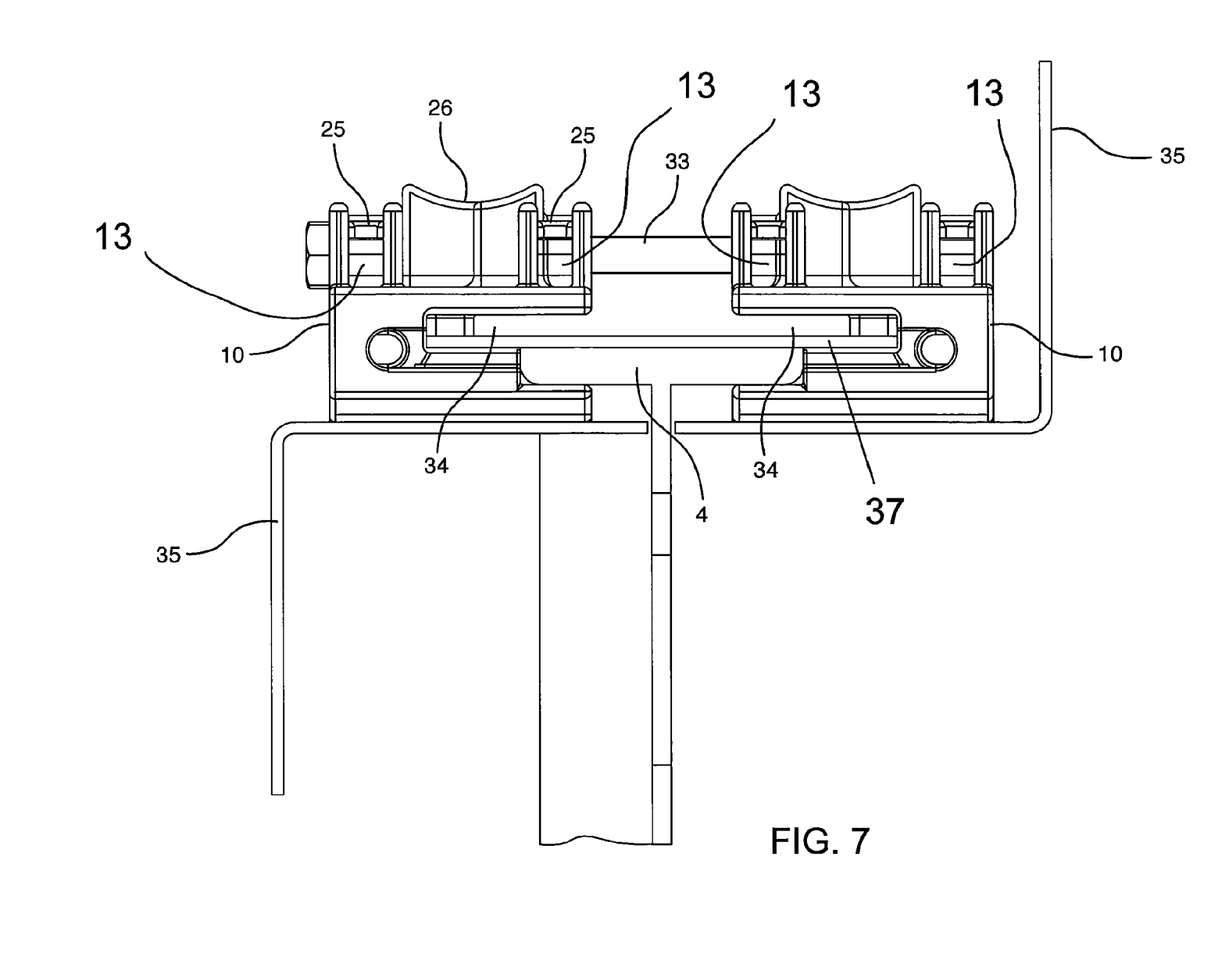
FIG. 7 is an end view along line 7-7 of FIG. 14.
Figure 8:
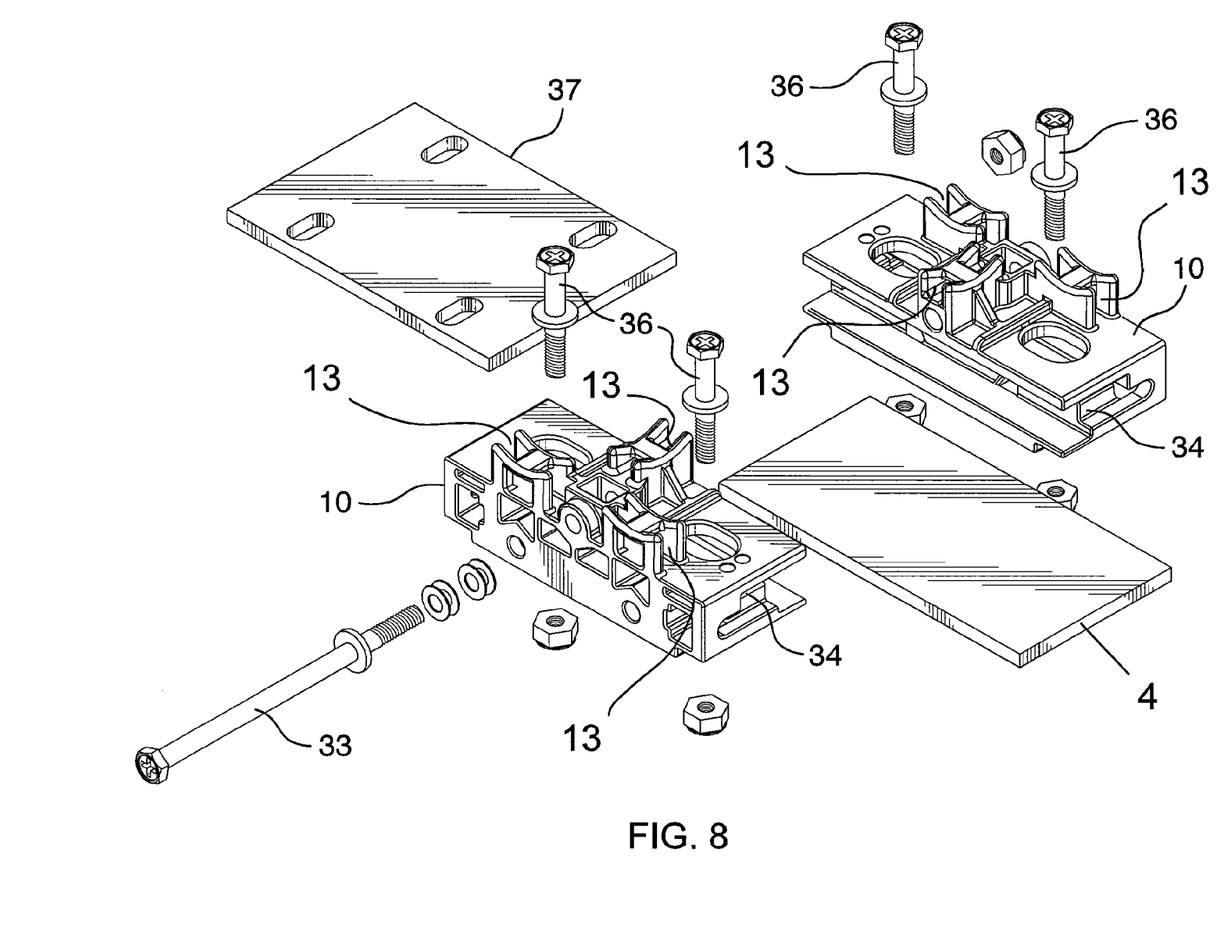
FIG. 8 is an exploded isometric view of the support bracket of FIG. 6 comprising two support bodies, a spacer plate, an insulating plate, one lateral bolt and four vertical bolts.
Figure 9:
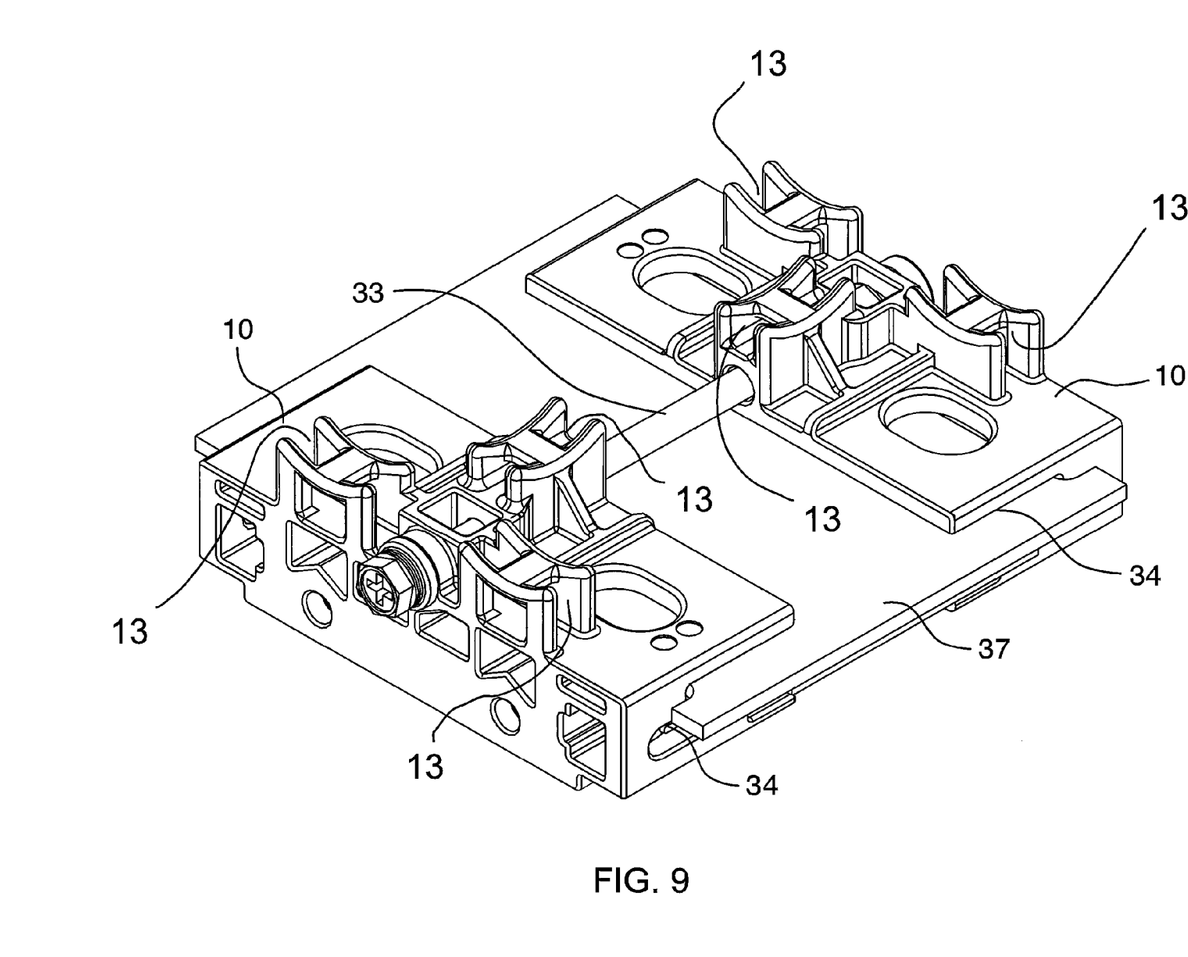
FIG. 9 shows the same pair of support bodies of FIG. 8 but as assembled together with a lateral threaded rod connector.

FIGS. 8-9 show a spacer plate 37 engageable in the lateral slots 34 to limit the movement of the bodies 10 towards each other. Vertical bolts 36 secure the bodies 10 to the spacer plate 37. FIGS. 6-7 show the option of using the bodies 10 to also mount angles 35 or other metal plates to the flange 4 in a removable manner.

Although the above description relates to specific preferred embodiments as presently contemplated by the inventor, it will be understood that the invention in its broad aspect includes mechanical and functional equivalents of the elements described herein.

I claim:

1. A support bracket for mounting wires, cables, conduits and the like to floor beams of an aircraft passenger cabin floor without modification to the floor beams, the floor beams having a top flange, a bottom flange, and a vertical web therebetween, the support bracket comprising:
a support body having a plurality of cradles wherein each cradle has a cradling surface and a tie wrap passage;
at least one clamping block connected to the support body with at least one adjustable tension bolt, the clamping block having a beam engaging surface wherein tension in the at least one bolt urges the beam engaging surface toward the support body;
wherein the support body and the at least one clamping body engage the floor beam in at least two spaced apart first and second locations selected from: a first location on a side edge of top flange and a second location on a vertically opposing side edge of a bottom flange; a first location on a side edge of the top flange and a second location on a horizontally opposing side edge of the top flange; and a first location on a side edge of the bottom flange and a second location on a horizontally opposing side edge of the bottom flange;
an upper clamping block connected to the support body with an upper adjustable tension bolt and having an upper beam engaging ridge; and
a lower clamping block connected to the support body with a lower adjustable tension bolt and having a lower beam engaging ridge.

2. A support bracket according to claim 1 comprising a single clamping block.

3. A support bracket according to claim 1 wherein each clamping block includes a fulcrum projection.

4. A support bracket according to claim 3 wherein the body includes a fulcrum recess mating the fulcrum projection.

5. A support bracket according to claim 1 wherein the body includes a removable post having a plurality of cradles wherein each cradle has an engaging surface and a wrap tie passage.

6. A support bracket according to claim 1 comprising a first support body and wherein the clamping block comprises a second support body, wherein the first and second support bodies each have a lateral slot defining an internal beam flange clamping surface adapted to mount on the opposing side edges of at least one of: the top flange; and the bottom flange and wherein the at least one tension bolt comprises a laterally extending threaded rod passing through the first and second support bodies across the at least one of: the top flange; and the bottom flange.

7. A support bracket according to claim 6 including a spacer plate engageable in said lateral slot.

\* \* \* \* \*